US009010479B2

(12) United States Patent
Kambayashi

(10) Patent No.: US 9,010,479 B2
(45) Date of Patent: Apr. 21, 2015

(54) VEHICLE FRONT STRUCTURE

(71) Applicant: Taku Kambayashi, Toyota (JP)

(72) Inventor: Taku Kambayashi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/354,373

(22) PCT Filed: Oct. 26, 2012

(86) PCT No.: PCT/IB2012/002296
§ 371 (c)(1),
(2) Date: Apr. 25, 2014

(87) PCT Pub. No.: WO2013/061153
PCT Pub. Date: May 2, 2013

(65) Prior Publication Data
US 2014/0311812 A1    Oct. 23, 2014

(30) Foreign Application Priority Data

Oct. 27, 2011  (JP) ................................ 2011-236463

(51) Int. Cl.
| | |
|---|---|
| *B60K 1/00* | (2006.01) |
| *B60H 1/32* | (2006.01) |
| *B62D 25/08* | (2006.01) |
| *B60K 5/12* | (2006.01) |
| *B60K 11/04* | (2006.01) |

(52) U.S. Cl.
CPC ............... *B60H 1/3223* (2013.01); *B60K 1/00* (2013.01); *B62D 25/082* (2013.01); *B60K 5/1216* (2013.01); *B60K 5/1241* (2013.01); *B60K 11/04* (2013.01); *B60K 2001/001* (2013.01); *B60K 2001/003* (2013.01); *B60Y 2400/61* (2013.01)

(58) Field of Classification Search
CPC .... B60K 1/00; B60K 1/04; B60K 2001/0438; B60K 5/1216
USPC ................ 180/297, 291, 299, 300, 65.8, 65.1
See application file for complete search history.

(56) References Cited

U.S. PATENT DOCUMENTS

| | | | | |
|---|---|---|---|---|
| 5,078,230 | A | * | 1/1992 | Hasuike ......................... 180/291 |
| 5,443,130 | A | * | 8/1995 | Tanaka et al. ................. 180/65.6 |
| 5,915,495 | A | * | 6/1999 | Kerlin et al. .................. 180/291 |

(Continued)

FOREIGN PATENT DOCUMENTS

| | | |
|---|---|---|
| EP | 1 288 050 A1 | 3/2003 |
| JP | 2002-274194 | 9/2002 |

(Continued)

*Primary Examiner* — Brodie Follman
(74) *Attorney, Agent, or Firm* — Finnegan, Henderson, Farabow, Garrett & Dunner, LLP

(57) ABSTRACT

A vehicle front structure includes: a motor unit for driving front wheels that is accommodated in a motor room formed in a front portion of a vehicle, and that has a driving shaft arranged coaxially with drive shafts connected to the front wheels; an air compressor that is securely attached to a rear portion of the motor unit in a vehicle longitudinal direction; a front side member that is arranged outward of the motor unit in a vehicle lateral direction, and that extends in the vehicle longitudinal direction; a cross member that is arranged above the motor unit in a vehicle height direction, that extends in the vehicle lateral direction, and that is connected to the front side member; and an inverter that is arranged above the cross member in the vehicle height direction, and that supplies electric power to the motor unit.

6 Claims, 3 Drawing Sheets

(56) References Cited

U.S. PATENT DOCUMENTS

| | | | |
|---|---|---|---|
| 6,494,286 B2* | 12/2002 | Shimizu et al. | 180/299 |
| 6,722,696 B2* | 4/2004 | Sonomura et al. | 280/784 |
| 6,973,982 B2* | 12/2005 | Yoshikawa et al. | 429/430 |
| 7,232,005 B2* | 6/2007 | Komatsu et al. | 180/299 |
| 7,393,016 B2* | 7/2008 | Mitsui et al. | 280/784 |
| 7,445,076 B2* | 11/2008 | Shigematsu | 180/299 |
| 7,588,117 B2* | 9/2009 | Fukuda | 180/291 |
| 7,874,395 B2* | 1/2011 | Taji et al. | 180/300 |
| 8,474,555 B2* | 7/2013 | Kanno | 180/65.1 |
| 8,517,127 B2* | 8/2013 | Kanno | 180/65.1 |
| 8,596,403 B2* | 12/2013 | Cunningham et al. | 180/300 |
| 8,770,326 B2* | 7/2014 | Matano | 180/65.1 |
| 8,813,883 B2* | 8/2014 | Fujiwara | 180/65.22 |
| 8,851,223 B2* | 10/2014 | Yamashita et al. | 180/291 |
| 8,894,134 B2* | 11/2014 | Tomozawa et al. | 296/204 |
| 2002/0033594 A1* | 3/2002 | Yamamoto et al. | 280/781 |
| 2002/0096384 A1* | 7/2002 | Yoshida et al. | 180/298 |
| 2003/0034186 A1* | 2/2003 | Morita et al. | 180/65.1 |
| 2003/0042053 A1 | 3/2003 | Yoshikawa et al. | |
| 2005/0079068 A1* | 4/2005 | Shigematsu | 417/363 |
| 2007/0051549 A1* | 3/2007 | Fukuda | 180/232 |
| 2008/0142289 A1* | 6/2008 | Yang et al. | 180/299 |
| 2011/0162899 A1* | 7/2011 | Blade | 180/65.1 |
| 2012/0031689 A1* | 2/2012 | Kanno | 180/65.1 |
| 2012/0031690 A1* | 2/2012 | Kanno | 180/65.1 |
| 2012/0055721 A1* | 3/2012 | Matano | 180/65.1 |
| 2012/0292124 A1* | 11/2012 | Yamashita et al. | 180/291 |
| 2014/0311812 A1* | 10/2014 | Kambayashi | 180/65.1 |
| 2014/0311842 A1* | 10/2014 | Kambayashi et al. | 188/371 |

FOREIGN PATENT DOCUMENTS

| | | |
|---|---|---|
| JP | 2003-72392 | 3/2003 |
| JP | 2004-255967 | 9/2004 |
| JP | 2004-314803 | 11/2004 |
| JP | 2005-112240 | 4/2005 |
| JP | 2005-138824 | 6/2005 |
| JP | 2006-219020 | 8/2006 |
| JP | 2010-274912 | 12/2010 |

* cited by examiner

VEHICLE FRONT STRUCTURE

CROSS-REFERENCE TO RELATED APPLICATIONS

This application is a national phase application of International Application No. PCT/IB2012/002296, filed Oct. 26, 2012, and claims the priority of Japanese Application No. 2011-236463, filed Oct. 27, 2011, the content of both of which is incorporated herein by reference.

BACKGROUND OF THE INVENTION

1. Field of the Invention

The invention relates to a vehicle front structure.

2. Description of Related Art

There is a conventional component mounting structure inside a motor room, which includes a vehicle drive motor accommodated in the motor room formed in a vehicle front portion and an air compressor securely attached to a front portion of the motor (e.g., see Japanese Patent Application Publication No. 2006-219020 (JP 2006-219020 A)).

In the above-described component mounting structure inside the motor room, the air compressor is securely attached to the front portion of the motor. Therefore, in the event of a vehicle front collision, a member arranged in front of the air compressor, for example, a radiator may come into contact with the air compressor and the deformation amount of a front side member may be insufficient.

SUMMARY OF THE INVENTION

The invention provides a vehicle front structure that allows a front side member to deform by a sufficient deformation amount.

A vehicle front structure according to an aspect of the invention includes: a motor unit for driving front wheels that is accommodated in a motor room formed in a front portion of a vehicle, and that has a driving shaft arranged coaxially with drive shafts connected to the front wheels; an air compressor that is securely attached to a rear portion of the motor unit in a vehicle longitudinal direction; a front side member that is arranged outward of the motor unit in a vehicle lateral direction, and that extends in the vehicle longitudinal direction; a cross member that is arranged above the motor unit in a vehicle height direction, that extends in the vehicle lateral direction, and that is connected to the front side member; and an inverter that is arranged above the cross member in the vehicle height direction, and that supplies electric power to the motor unit.

In the vehicle front structure according to the above aspect, the motor unit for driving the front wheels has a so-called single-axis configuration in which the driving shaft is arranged coaxially with the drive shafts. Because the motor unit has such a single-axis configuration, a space is secured behind the motor unit and the air compressor is arranged in the space. Accordingly, even if a member such as a radiator is arranged in front of the motor unit in the vehicle longitudinal direction, it is possible to avoid the situation where the air compressor comes into contact with the member such as the radiator before the motor unit comes into contact with the member. Further, it is possible to allow the front side member to deform by a sufficient amount.

The vehicle front structure according to the aspect may include: a suspension member rear portion arranged behind a vehicle rear side of the motor unit and extending in the vehicle lateral direction to constitute a rear portion of a suspension member; and a torque rod extending in the vehicle longitudinal direction so as to connect the motor unit with the suspension member rear portion and having a bending portion to be a starting point of bending deformation at an intermediate portion of the torque in the vehicle longitudinal direction.

In the above-described vehicle front structure, the motor unit and the suspension member rear portion are connected to each other by the torque rod that extends in the vehicle longitudinal direction. Further, the torque rod has the bending portion, which serves as a starting point of bending deformation, at its intermediate portion in the vehicle longitudinal direction. Accordingly, in the event of a vehicle front collision, the torque rod is deformed by bending downward in the vehicle-height direction, using the bending portion as a starting point of bending deformation. Thus, it is possible to absorb an impact at the time of the vehicle front collision.

Further, because the torque rod is arranged in the space that is sufficiently secured behind the motor unit due to employment of the single-axis configuration of the motor unit, the torque rod is sufficiently long in the vehicle longitudinal direction. This makes it possible to more efficiently absorb an impact in the event of a vehicle front collision.

In the vehicle front structure according to the above aspect, the front side member may have: a first horizontal portion that extends in the vehicle longitudinal direction, and to which the cross member is connected; a sloped portion that extends from a rear of the first horizontal portion, and that is sloped downward in a direction toward a rear of the vehicle; and a second horizontal portion that extends from a rear of the sloped portion in the vehicle longitudinal direction. Further, the motor unit may be fixed to the cross member, and the suspension member rear portion may be fixed to the second horizontal portion.

In the above-described vehicle front structure, the motor unit is fixed to the cross member connected to the first horizontal portion of the front side member and the suspension member rear portion is fixed to the second horizontal portion of the front side member. This makes it possible to set the length of the torque rod further longer. Accordingly, the impact absorption performance in the event of a vehicle front collision is enhanced.

In the vehicle front structure according to the aspect, a position of the inverter in the vehicle longitudinal direction may be between a front end and a rear end of the cross member.

In the vehicle front structure, the position of the inverter in the vehicle longitudinal direction is between the front end and the rear end of the cross member. Accordingly, because the range in which the inverter extends in the vehicle longitudinal direction is within the range in which the cross member extends in the vehicle longitudinal direction, the inverter, which is a high voltage component, is protected by the cross member even in the event of a vehicle front collision.

As described above in detail, according to the invention, the front side member is allowed to deform by a sufficient deformation amount.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

Note that an arrow UP, an arrow FR, and an arrow OUT shown in each drawing denote the upper side in the vehicle-height direction, the front side in the vehicle longitudinal direction, and the outer side (right side) in the vehicle lateral direction, respectively.

Figure 1:
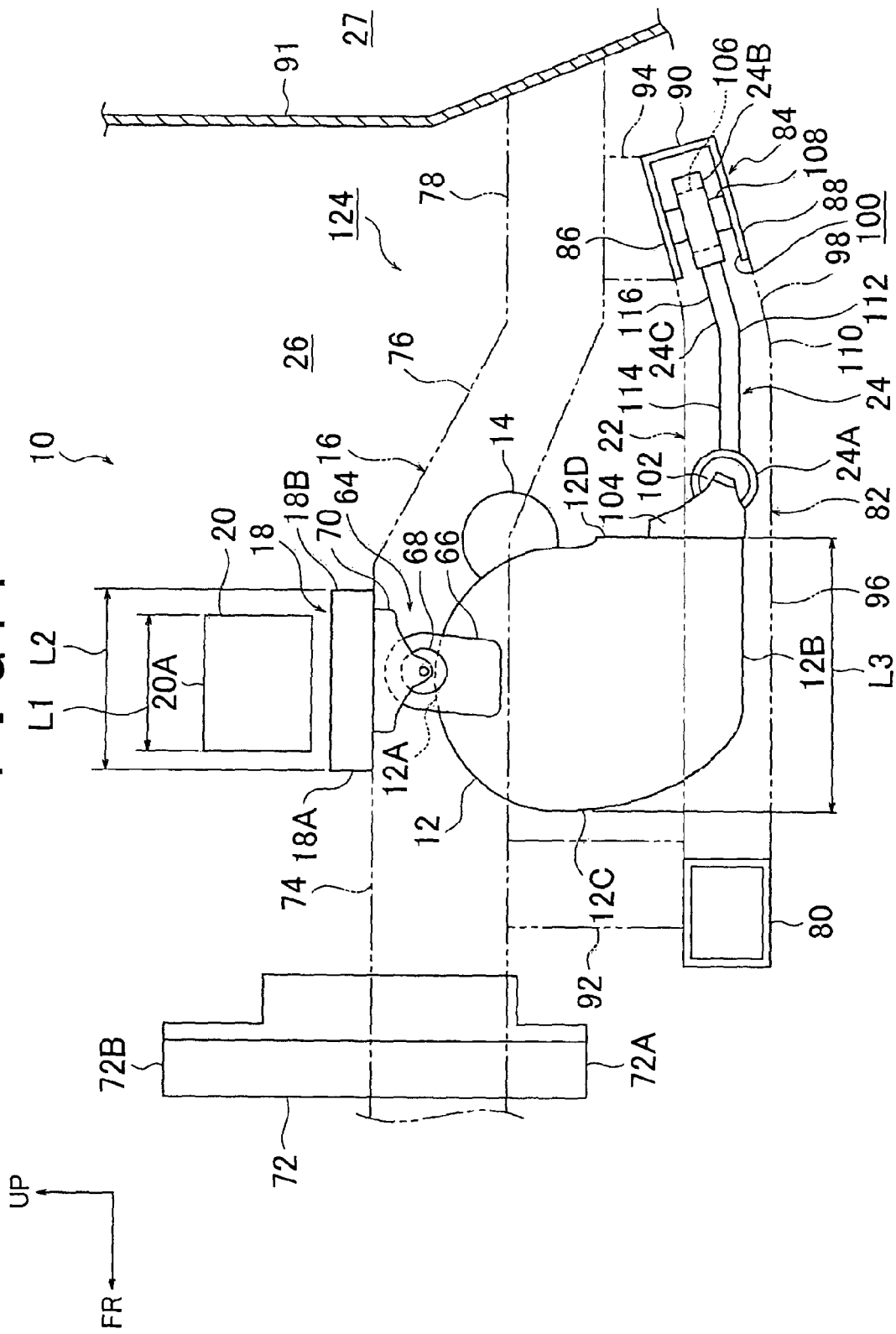
FIG. 1 is a side view of a vehicle front structure according to an embodiment of the invention.

As shown in FIG. 1, a vehicle front structure 10 according to an embodiment of the invention includes a motor unit 12, an air compressor 14, a front side member 16, a cross member 18, an inverter 20, a suspension member 22, and a torque rod 24.

Figure 2:
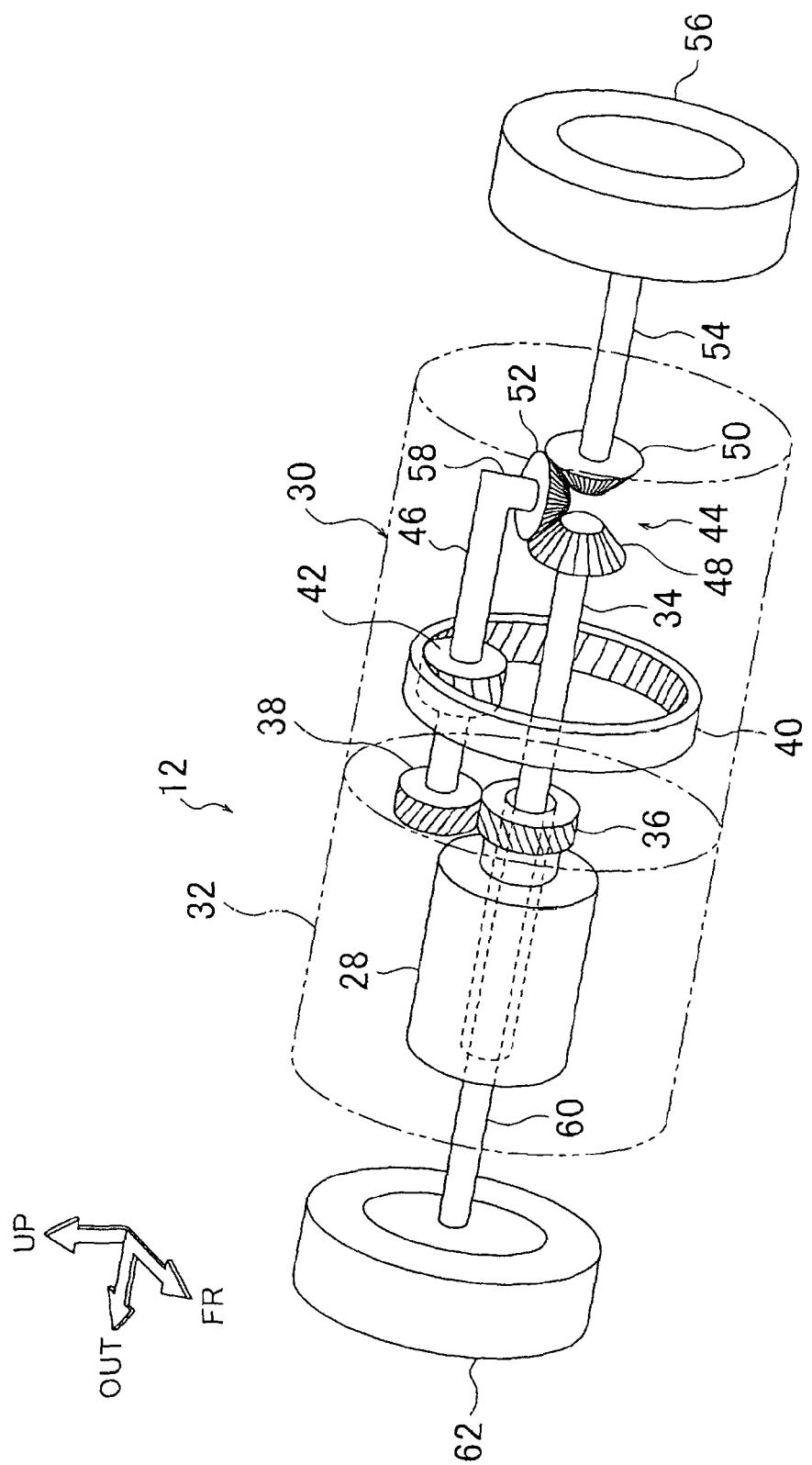
FIG. 2 is a perspective view of a motor unit shown in FIG. 1 and its surrounding portions.

The motor unit 12 is used to drive front wheels, and is accommodated in a motor room 26 formed in a vehicle front portion. As shown in FIG. 2, the motor unit 12 includes a motor 28, a transaxle 30, and a motor case 32 that accommodates the motor 28 and that is integrated with the transaxle 30. The motor 28 has a driving shaft 34 arranged with its axial direction extending in the vehicle lateral direction.

The transaxle 30 includes a sun gear 36, a pinion gear 38, an internal gear 40, a planetary gear 42, and a differential gear 44. The sun gear 36 is arranged at an intermediate portion of the driving shaft 34 in its axial direction, and the pinion gear 38 is in mesh with the sun gear 36. The pinion gear 38 is arranged at one end of a revolving shaft 46 arranged parallel to the driving shaft 34, and the driving shaft 34 and the revolving shaft 46 are passed through the internal gear 40.

The internal gear 40 is arranged coaxially with the driving shaft 34, and is in mesh with the planetary gear 42 arranged at an intermediate portion of the revolving shaft 46 in its axial direction. The differential gear 44 includes three pinion gears 48, 50, 52. The pinion gear 48 is arranged at one end of the driving shaft 34, and the pinion gear 50 is arranged at one end of one drive shaft 54. The drive shaft 54 is arranged coaxially with the driving shaft 34, and is connected to one front wheel 56.

A bending portion 58, which is bent so as to intersect with an extension line of the driving shaft 34, is formed at the other end of the revolving shaft 46, and the pinion gear 52 is fixed to the distal end of the bending portion 58. The pinion gear 52 is in mesh with the pinion gears 48, 50. The other drive shaft 60 arranged coaxially with the driving shaft 34 is formed integrally with the other end of the driving shaft 34, and the drive shaft 60 is connected to the other front wheel 62. Thus, the above-described motor unit 12 has a so-called single-axis configuration in which the driving shaft 34 is arranged coaxially with the drive shafts 54, 60.

As shown in FIG. 1, the motor unit 12 is fixed to a cross member 18, which will be described later, via a motor mount 64. More specifically, the motor mount 64 includes a mount body 66 fixed to the motor unit 12, a rubber bush 68 supported by this mount body 66, and a bracket 70 that connects the bush 68 with the cross member 18.

A radiator 72 (cooling module) is arranged in front of the motor unit 12 in the vehicle longitudinal direction. The radiator 72 is arranged at a position closer to the front of the vehicle than the front side member 16 (a first horizontal portion 74) and a suspension member front portion 80, which will be described later. The outer shape of the radiator 72 is a flat box shape that extends in the vehicle-height direction and the vehicle lateral direction, with its thickness direction extending in the vehicle longitudinal direction.

The position of a lower end portion 72A of this radiator 72 in the vehicle-height direction is located between an upper end portion 12A and a lower end portion 12B of the motor unit 12. The position of an upper end portion 72B of this radiator 72 in the vehicle-height direction is located above an upper end portion 20A of the inverter 20 in the vehicle-height direction.

The air compressor 14 is used to supply compressed air to a main portion of an air conditioning unit (not shown), and is securely attached to a rear portion of the motor unit 12. Note that this air compressor 14 may be used to supply compressed air to a fuel cell (not shown).

The front side member 16 is arranged outward of the motor unit 12 in the vehicle lateral direction, and extends in the vehicle longitudinal direction. Note that FIG. 1 shows only one front side member 16, but two front side members 16 are arranged on respective outer sides of the motor unit 12 in the vehicle lateral direction.

The front side member 16 has a first horizontal portion 74, a sloped portion 76, and a second horizontal portion 78. The first horizontal portion 74 extends in the vehicle longitudinal direction. The sloped portion 76 extends from the rear of the first horizontal portion 74, and is sloped downward in a direction toward the rear of the vehicle. The second horizontal portion 78 extends from the rear of the sloped portion 76 toward the rear of the vehicle in the vehicle longitudinal direction.

The cross member 18 is arranged above the motor unit 12 in the vehicle-height direction, and extends in the vehicle lateral direction. An outer end portion of the cross member 18 in the vehicle lateral direction is connected to a rear portion of the first horizontal portion 74. The inverter 20, which serves as a high voltage component that supplies electric power to the motor unit 12 (the motor 28), is arranged above the cross member 18 in the vehicle height direction.

The cross member 18 is located between a front end 12C and a rear end 12D of the motor unit 12 in the vehicle longitudinal direction. The inverter 20 is located between a front end 18A and a rear end 18B of the cross member 18 in the vehicle longitudinal direction. That is, the entirety of the cross member 18 in the vehicle longitudinal direction overlaps with an intermediate portion of the motor unit 12 between the front end 12C and the rear end 12D in the vehicle longitudinal direction. The entirety of the inverter 20 in the vehicle longitudinal direction overlaps with an intermediate portion of the cross member 18 between the front end 18A and the rear end 18B in the vehicle longitudinal direction.

In FIG. 1, a length L1 denotes the entire length of the inverter 20 in the vehicle longitudinal direction, and a length L2 denotes the entire length of the cross member 18 in the vehicle longitudinal direction. A length L3 denotes the entire length of the motor unit 12 in the vehicle longitudinal direction. The length L3 is longer than the length L2, and the length L2 is longer than the length L1 (L1<L2<L3).

The suspension member 22 is arranged below the front side member 16 in the vehicle-height direction. The suspension member 22 includes a suspension member front portion 80, suspension member side rails 82, and a suspension member rear portion 84. The suspension member front portion 80 extends in the vehicle lateral direction, and forms a front portion of the suspension member 22. The suspension member side rail 82 extends in the vehicle longitudinal direction, and forms a side portion of the suspension member 22. The suspension member rear portion 84 extends in the vehicle lateral direction, and forms a rear portion of the suspension member 22.

The suspension member front portion 80 is arranged in front of a lower portion of the motor unit 12 in the vehicle longitudinal direction, and the suspension member side rail 82 is arranged outward of the lower portion of the motor unit 12 in the vehicle lateral direction. Note that FIG. 1 shows only one suspension member side rail 82, but two suspension member side rails 82 are arranged at respective side portions of the suspension member 22.

The suspension member rear portion 84 is arranged behind the lower portion of the motor unit 12 in the vehicle longitudinal direction. The suspension member rear portion 84 is formed in a C-shape in cross section, and has a upper wall 86, a lower wall 88, and a rear wall 90.

An outer end portion of the suspension member front portion 80 in the vehicle lateral direction is fixed to an intermediate portion of the first horizontal portion 74 in the vehicle longitudinal direction, via a bracket 92 that extends in the vehicle-height direction. An outer end portion of the suspension member rear portion 84 in the vehicle lateral direction is fixed to an intermediate portion of the second horizontal portion 78 in the vehicle longitudinal direction, via a bracket 94 that extends in the vehicle-height direction. A dash panel 91 that extends in the vehicle-height direction to separate the motor room 26 from a vehicle compartment 27 is arranged behind the suspension member rear portion 84 in the vehicle longitudinal direction.

A portion of the suspension member side rail 82, which is closer to the front of the vehicle than a rear portion thereof, is a horizontal portion 96 that extends in the vehicle longitudinal direction. The rear portion of the suspension member side rail 82 is a sloped portion 98 that is sloped upward in a direction toward the rear of the vehicle. The suspension member rear portion 84 is also sloped in accordance with the slope of this sloped portion 98. Thus, an opening 100, which is formed at the front of the suspension member rear portion 84 in the vehicle longitudinal direction, is open toward the front of the vehicle and downward in the vehicle-height direction.

The torque rod 24 extends in the vehicle longitudinal direction, and connects the motor unit 12 with the suspension member rear portion 84. A front portion 24A of this torque rod 24 is fixed to a lower end portion of the rear face of the motor unit 12 via a rubber bush 102 and a bracket 104. A rear portion 24B of this torque rod 24 is fixed to the suspension member rear portion 84 via a rubber bush 106 and a shaft 108. The rear portion 24B of the torque rod 24 is accommodated inside the suspension member rear portion 84 through the opening 100, and the axial ends of the shaft 108 are fixed to the upper wall 86 and the lower wall 88, respectively.

A bending portion 110 is formed between the horizontal portion 96 and the sloped portion 98 in the above suspension member side rail 82. Further, a bending portion 112, which corresponds to the bending portion 110, is formed at an intermediate portion of the torque rod 24 in the vehicle longitudinal direction. The bending portion 112 is bent so as to form a convex downward in the vehicle-height direction. When an impact load is input into the torque rod 24 from the front side in the vehicle longitudinal direction, the bending portion 112 acts as a starting point of bending deformation of the torque rod 24 downward in the vehicle-height direction.

Figure 3:
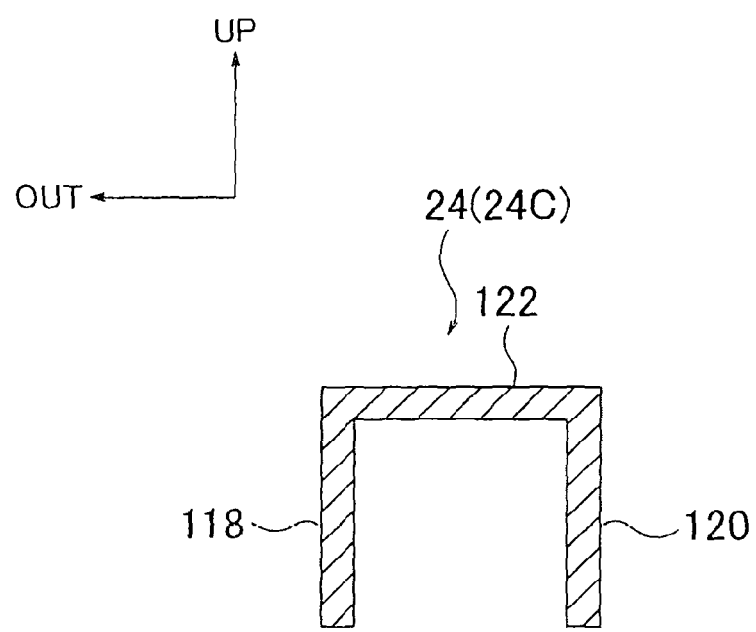
FIG. 3 is a front cross-sectional view of a torque rod shown in FIG. 1.

A portion of the torque rod 24, which is closer to the front of the vehicle than the bending portion 112, is a horizontal portion 114 that extends in the vehicle longitudinal direction, and a portion of the torque rod 24, which is closer to the rear of the vehicle than the bending portion 112, is a sloped portion 116 which is sloped upward in a direction toward the rear of the vehicle. Further, as shown in FIG. 3, a main portion 24C of the torque rod 24 between a front portion 24A and a rear portion 24B thereof is formed in a inverted U-shape in cross section, and has a pair of side walls 118, 120 that face each other in the vehicle lateral direction, and an upper wall 122 that connects upper ends of the side walls 118, 120 to each other. The main portion 24C has a uniform cross section over its entire length in its longitudinal direction.

Note that, in the present embodiment, the bending portion 112 is bent downward in the vehicle-height direction. However, the bending portion 112 may be in any other shapes (e.g. the bending portion 112 may have a cutout, bulge or a hole) as long as the bending portion 112 serves as a starting point of bending deformation of the torque rod 24 when an impact load is input into the torque rod 24 from the front in the vehicle longitudinal direction. Further, the direction in which the torque rod 24 is bent may be other than the downward direction in the vehicle-height direction.

Next, the operations and effects of the embodiment of the invention will be described below.

As discussed above in detail, in the vehicle front structure 10 according to the embodiment of the invention, the motor unit 12 for driving the front wheels has a so-called single-axis configuration in which the driving shaft 34 is arranged coaxially with the drive shafts 54, 60. Because the motor unit 12 has such a single-axis configuration, a space 124 is secured behind the motor unit 12 and the air compressor 14 is arranged in the space 124. Accordingly, even if a member such as a radiator 72 is arranged in front of the motor unit 12 in the vehicle longitudinal direction, it is possible to avoid the situation where the air compressor 14 comes into contact with the member such as the radiator 72 before the motor unit 12 comes into contact with the member. Further, it is possible to allow the front side member 16 to deform by a sufficient amount.

Further, the motor unit 12 and the suspension member rear portion 84 are coupled to each other by the torque rod 24 that extends in the vehicle longitudinal direction, and the torque rod 24 has the bending portion 112, which serves as a starting point of bending deformation, at its intermediate portion in the vehicle longitudinal direction. Accordingly, in the event of a vehicle front collision, the torque rod 24 is deformed by bending downward in the vehicle-height direction, using the bending portion 112 as a starting point of bending deformation. Thus, it possible to absorb an impact at the time of the vehicle front collision.

Further, because the cross member 18 on which the inverter 20 is mounted is connected to the front side member 16, the deformation of the front side member 16 may be restricted in the event of a vehicle front collision (the deformation amount of the front side member 16 may be decreased). However, the deformation of the torque rod 24 makes up for a decrease in the deformation amount of the front side member 16.

Because the torque rod 24 is arranged in the space 124 that is sufficiently secured behind the motor unit 12 due to employment of the single-axis configuration of the motor unit 12, the torque rod 24 is sufficiently long in the vehicle longitudinal direction. This makes it possible to more efficiently absorb an impact in the event of a vehicle front collision.

The motor unit 12 is fixed to the cross member 18 connected to the first horizontal portion 74 of the front side member 16 and the suspension member rear portion 84 is fixed to the second horizontal portion 78 of the front side member 16. This makes it possible to set the length of the torque rod 24 further longer. Accordingly, the impact absorption performance in the event of a vehicle front collision is enhanced.

With the vehicle front structure 10 described above, in the event of a vehicle front collision, while the front side member 16 is deformed in the vehicle longitudinal direction by a sufficient deformation amount, the torque rod 24 is also deformed. Therefore, it is possible to enhance the impact absorption performance (impact relaxation performance) in the event of a vehicle front collision.

In addition, in the vehicle front structure 10, the position of the inverter 20 in the vehicle longitudinal direction is between the front end 18A and the rear end 18B of the cross member 18. Accordingly, because the range in which the inverter 20 extends in the vehicle longitudinal direction is within the range in which the cross member 18 extends in the vehicle longitudinal direction, the inverter 20, which is a high voltage component, is protected by the cross member 18 even in the event of a vehicle front collision.

Further, the position of the cross member 18 in the vehicle longitudinal direction is between the front end 12C and the rear end 12D of the motor unit 12. Accordingly, the range in which the inverter 20 extends in the vehicle longitudinal direction is also within the range in which this motor unit 12 extends in the vehicle longitudinal direction. Therefore, it is possible to protect the inverter 20, which is a high voltage component, further reliably.

With the vehicle front structure 10 described above, it is possible to effectively achieve both the performance of protecting the inverter 20, which is a high voltage component, and the impact absorption performance in the event of a vehicle front collision.

Note that the relation among the entire length L1 of the inverter 20 in the vehicle longitudinal direction, the entire length L2 of the cross member 18 in the vehicle longitudinal direction, and the entire length L3 of the motor unit 12 in the vehicle longitudinal direction may be other than L1<L2<L3.

The one embodiment of the invention has been described above. However, the invention is not limited to the above-described embodiment, and may be implemented in various other modified examples within the scope of the invention.

The invention claimed is:

1. A vehicle front structure, comprising:
    a motor unit for driving front wheels that is accommodated in a motor room formed in a front portion of a vehicle, and that has a driving shaft arranged coaxially with drive shafts connected to the front wheels;
    an air compressor that is securely attached to a rear portion of the motor unit in a vehicle longitudinal direction;
    a front side member that is arranged outward of the motor unit in a vehicle lateral direction, and that extends in the vehicle longitudinal direction;
    a cross member that is arranged above the motor unit in a vehicle height direction, that extends in the vehicle lateral direction, and that is connected to the front side member; and
    an inverter that is arranged above the cross member in the vehicle height direction, and that supplies electric power to the motor unit.

2. The vehicle front structure according to claim 1, further comprising:
    a suspension member rear portion that is arranged behind the motor unit in the vehicle longitudinal direction, and that extends in the vehicle lateral direction to form a rear portion of a suspension member; and
    a torque rod that extends in the vehicle longitudinal direction to connect the motor unit with the suspension member rear portion, and that has a bending portion at an intermediate portion in the vehicle longitudinal direction, the bending portion serving as a starting point of bending deformation of the torque rod.

3. The vehicle front structure according to claim 2, wherein the front side member has:
    a first horizontal portion that extends in the vehicle longitudinal direction, and to which the cross member is connected;
    a sloped portion that extends from a rear of the first horizontal portion, and that is sloped downward in a direction toward a rear of the vehicle; and
    a second horizontal portion that extends from a rear of the sloped portion in the vehicle longitudinal direction, and
    the motor unit is fixed to the cross member, and the suspension member rear portion is fixed to the second horizontal portion.

4. The vehicle front structure according to claim 1, wherein a position of the inverter in the vehicle longitudinal direction is between a front end and a rear end of the cross member.

5. The vehicle front structure according to claim 4, wherein an entire length of the motor unit in the vehicle longitudinal direction is longer than an entire length of the cross member in the vehicle longitudinal direction, and the entire length of the cross member in the vehicle longitudinal direction is longer than an entire length of the inverter in the vehicle longitudinal direction.

6. The vehicle front structure according to claim 1, wherein a radiator is arranged in front of the motor unit in the vehicle longitudinal direction.

* * * * *